G. F. SCHODDE.
CONTROL VALVE MECHANISM.
APPLICATION FILED NOV. 18, 1908.
926,142.
Patented June 29, 1909.
2 SHEETS—SHEET 1.
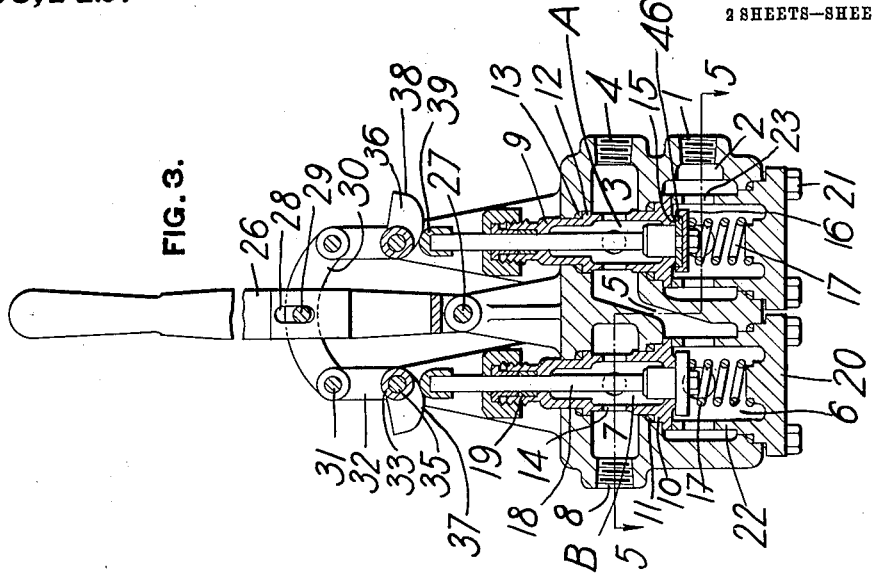
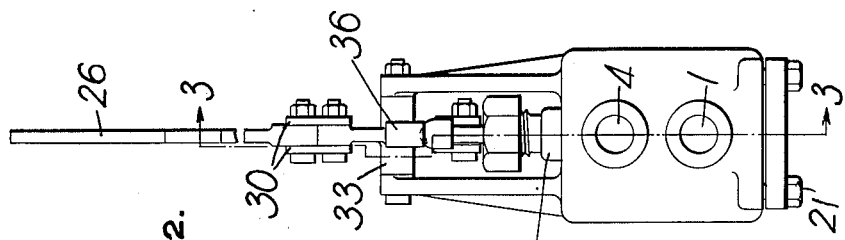
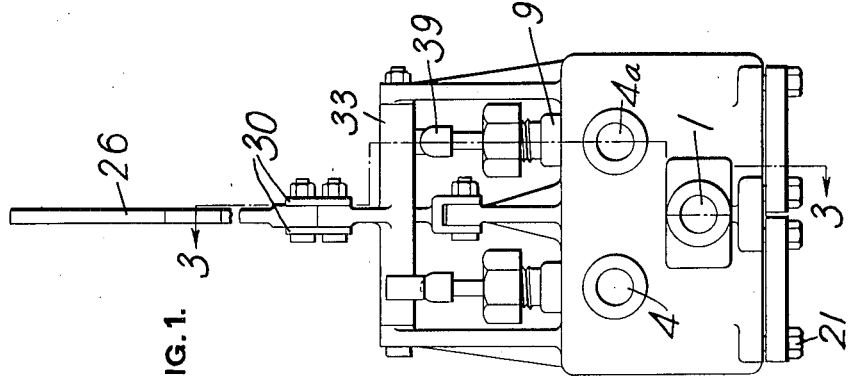
WITNESSES
Chas. Fosterman
Estelle Johnson
INVENTOR
George F. Schodde
By Frank H. Wister
His Attorney.

G. F. SCHODDE.
CONTROL VALVE MECHANISM.
APPLICATION FILED NOV. 18, 1908.
926,142.
Patented June 29, 1909.
2 SHEETS—SHEET 2.
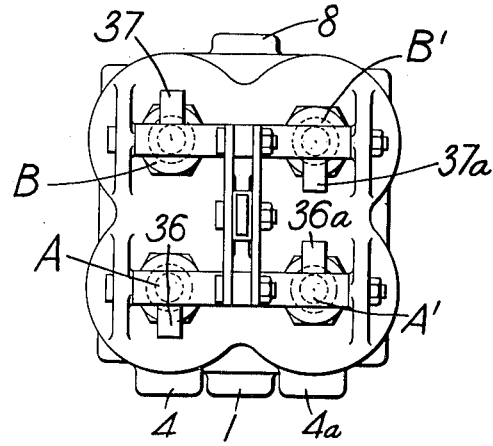
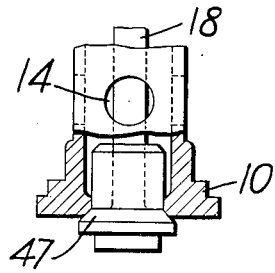
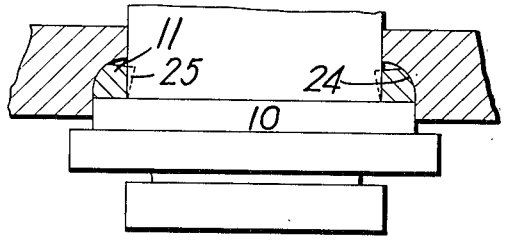
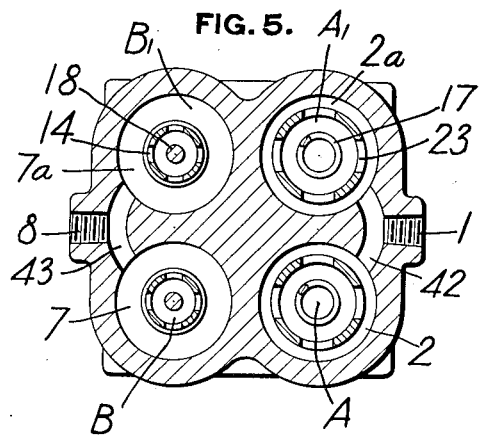
WITNESSES
Chas. Joderman
Estelle Johnson
INVENTOR
George F. Schodde
By Fredk H. Winter
His Attorney

UNITED STATES PATENT OFFICE.

GEORGE F. SCHODDE, OF PITTSBURG, PENNSYLVANIA.

CONTROL-VALVE MECHANISM.

No. 926,142.	Specification of Letters Patent.	Patented June 29, 1909.

Application filed November 18, 1908. Serial No. 463,312.

*To all whom it may concern:*

Be it known that I, GEORGE F. SCHODDE, a resident of Pittsburg, in the county of Allegheny and State of Pennsylvania, have invented a new and useful Improvement in Control-Valve Mechanism, of which the following in a specification.

This invention relates to control valve mechanism such as used for operating power cylinders in manufacturing plants or for reversing various forms of mechanism, including steam engines.

The object of the invention is to provide reversing valve mechanism for either hydraulic, compressed air or steam mechanism, which is comparatively free from wear, contains no cups or other parts which become rapidly worn, which can be easily repaired, and in which the parts subjected to wear are in separate pieces so that in case of excessive wear at any point only a small part of the device need be discarded and renewed.

For the accomplishment of the aforesaid and other objects the invention comprises the construction and arrangement of parts hereinafter described and claimed.

In the accompanying drawings Figure 1 is an end elevation of a four way valve embodying the invention; Fig. 2 is a similar view of a three way valve embodying the invention; Fig. 3 is a vertical section on the line 3—3, Figs. 1 and 2; Fig. 4 is a plan view of the four way valve; Fig. 5 is a horizontal section through the same on the line 5—5, Fig. 3; Fig. 6 is a detail sectional view showing the modification of the valve member when adapted for steam; and Fig. 7 is a detail sectional view of the packing ring and its seat.

The three way valve is substantially one-half of the four way valve, or in other words the four way valve is substantially two three way valves having common supply inlet and waste or exhaust outlet and operating mechanism. The valve comprises a suitable body made of cast metal and provided, in the case of the three way valve, with a pair of valve chambers and in the case of four way valve with four valve chambers. Since the two sides of the four way valve are identical with each other and each side is similar to the three way valve a description of one side will be sufficient. This arrangement is shown in Fig. 3. As here shown the supply inlet 1 communicates with a chamber 2 in the lower part of the front side of the valve body, which chamber in turn communicates with a chamber 3 above the chamber 2, said chamber 3 communicating with the service port 4 and being connected by a downward inclined passage 5 with a chamber 6 in the bottom of the valve body at the rear of the same, which chamber 6 communicates with a chamber 7 above the same, which chamber is in communication with the waste or exhaust port 8. The walls between chambers 2 and 3 and chambers 6 and 7 are provided with openings in which are located the valve fittings 9, which project upwardly through openings in the top of the valve body and in alinement with the openings forming communication between the chambers 2 and 3 and chambers 6 and 7 respectively.

The valve fittings are all identical, two being used in the case of the three way valve and four in the case of the four way valve. Each of these fittings is tubular or in the form of a sleeve provided with a flange 10 near its lower end to confine a packing ring 11 placed in the wall between the lower and upper chambers, and near its upper end with a flange 12 to confine a packing ring 13 in the top wall of the valve body, so as to give a fluid tight joint at both places. These valve fittings 9 are provided with holes 14 forming communication with their interiors and the chambers 3 and 7 respectively. These fittings are open at their lower ends and each is provided with a suitable seat 15 for the valve 16 which is normally held against the seat by the bottom spring 17 and is carried by a stem 18 extending up through stuffing box 19 on the upper end of the fitting 9 outside of the valve body. The valve fittings 9 are put in place through openings in the bottom of the valve body, said openings being closed by caps 20 which are held by the threaded studs 21 or similar means and which form the seats for the lower ends of spring 17. These caps are provided with tubular upward projections 22 bearing against the bottom faces of fittings 9 and holding the latter in place. The tubular projections 22 are provided with holes 23 forming a communication between their interiors and the chambers 2 and 6 respectively. The seats for the packing rings 11 and 13 are formed on a radius or cut away at their outer corners, as shown at 24, Fig. 7, so that when said rings are forced into the seats the rings are crowded inwardly, as at 25, Fig. 7, to more tightly embrace the fittings 9 and prevent leakage.

The springs 17 are only just strong enough to counterbalance the valves and hold them normally to their seats. These valves are arranged to be operated alternately to admit and exhaust pressure from the apparatus connected to service port 4. The admission valves are marked A and A' and the exhaust valves are marked B and B'. Supply pressure is at all times in chamber 2, thus holding valve A tightly closed. When valve A is opened the pressure passes from chamber 2 to chamber 3 and thence through port 4 to the mechanism to be operated. This valve can be held open as long as desired. To exhaust the pressure the valve A is closed and valve B opened so that the pressure from port 4 escapes through chamber 3 and passage 5 to chamber 6 and thence to chamber 7 and exhaust port 8. The same operation takes place as to valves A' and B'.

Operating mechanism is provided for opening the admission and exhaust valves alternately. The mechanism shown comprises a lever 26 fulcrumed at 27 and provided with slot 28 which is engaged by pin 29 on links 30, which at their ends are pivotally connected by pins 31 to arms 32 on cam members 33 journaled on pins 35 and arranged to contact with the valve stems 18. In the case of the three way valve each cam member 33 is provided with a single cam, which are marked 36 and 37 respectively. These cams are reversely arranged, one to operate valve A and the other to operate valve B, and on account of being reversely arranged only one of said valves can be operated at any time. It is obvious that when the lever is swung to the right, Fig. 3, cam 36 will open valve A, and cam 37 will swing idly upwardly without affecting valve B, while when the reverse operation occurs cam 36 will release valve A permitting spring 17 to seat said valve, while cam 37 will open valve B. In this way only one valve can be open at the same time, and the reversal of the fluid operated mechanism is obtained by merely moving the lever in the proper direction. The cams 36 and 37 have faces 38 substantially concentric to their pivots, so that when these engage the valve stems the cams will remain in such position without holding the lever, so that either the admission or exhaust valve can be held open as long as desired. In order to reduce wear the valve stems may be provided with hardened caps 39 against which the cams 36 and 37 bear.

The operation just described is the operation of the three way valve. The four way valve is identical, being merely a duplicate, having two sides similar to Fig. 3 and which are entirely independent of each other. The supply port 1 is connected by passage 42 with chambers 2 and 2ª on the two sides of the valve while the exhaust port 8 is connected by passage 43 with chambers 7 and 7ª on the two sides of the valve. Two service ports, 4 and 4ª, are present, each having its own connections, such as to opposite ends of a double acting cylinder. Each side of the four way valve has an admission and exhaust valve exactly similar to those in the three way valves, the admission valves being marked A and A' and the exhaust valves B and B'. The cams in this case are formed double, the admission cam member 33 having cams 36 and 36ª, while the exhaust cam member has cams 37 and 37ª. Cams 36 and 36ª are oppositely arranged on the cam carrying member and cams 37 and 37ª are also oppositely arranged on the cam carrying member. Consequently when the lever 26 is moved to the right, Fig. 3, admission valve A is opened to admit fluid pressure through the service port 4, and at the same time exhaust valve B' is opened to release pressure coming from service port 4ª. In this position admission valve A' and exhaust valve B are closed. When the lever is moved in the opposite direction admission valve A and exhaust valve B' close, while admission valve A' is opened to admit pressure through service port 4ª, while exhaust valve B is opened to release pressure coming from service port 4. This four way valve is in effect merely a double three way valve having a common supply and a common exhaust port and a common operating handle, the cams being arranged to operate the two sides of the valve mechanism alternately.

For hydraulic purposes each valve will be such as shown in Fig. 3, being in the form of a disk provided with a fiber or other washer 46 seating against the flat seat on the lower end of the valve fitting. For steam operating mechanism the valve will be such as shown in Fig. 6, the fiber or other packing being omitted, and the metallic valve provided with a beveled face 47 seating against a similar face in the valve fitting.

The construction and operation of the valve will be readily understood from the foregoing description. The entire valve mechanism is free from cups or other parts which quickly wear and leak. Furthermore, the parts which are subjected to wear are formed in separate pieces and the wearing parts for the several valves are entirely independent of each other so that in case of wear only a small part of the valve mechanism need be discarded. Each one of the valves and its fittings can be independently removed, and all the parts are easily accessible so that repairs can be made quickly and with a minimum amount of interference with the mechanism supplied with pressure through the valve.

What I claim is:

1. In control valve mechanism, a body or casing provided with supply, service and exhaust openings, and having an opening connecting the supply and service openings and openings in its wall in line with said last named opening, and having another opening connecting the service and exhaust openings and openings in its walls in line with said last named opening, a one piece sleeve fitting in each set of alining openings and having one of its ends projecting through one of the walls and beyond the body and provided with a valve seat, removable plates closing the openings in the opposite wall of the body valves in said sleeves coöperating with said seats, and valve operating stems extending through the projecting ends of said sleeves.

2. In control valve mechanism, a body or casing provided with supply, service and exhaust openings, and having an opening connecting the supply and service openings and openings in its walls in line with said last named opening, and having another opening connecting the service and exhaust openings and openings in its walls in line with said last named opening, a sleeve fitting in each set of alining openings and having one end projecting beyond the body and being provided with a valve seat, removable plates closing the openings in one of the walls of the body and contacting with said sleeves and holding the same in place, valves in said sleeves coöperating with the seats therein, and valve operating stems extending through the projecting ends of said sleeves.

3. In control valve mechanism, a body or casing provided with supply and exhaust chambers, and above the supply chamber with a passage connecting a service port with the exhaust chamber, and above the exhaust chamber with a passage leading to an exhaust port, and being provided with alining openings through the top and bottom walls and with openings connecting respectively the supply chamber with the service passage and the exhaust chamber with the exhaust passage, a sleeve in each set of said alining openings, said sleeves projecting up through the openings in the top wall of the casing and being open at their lower ends to the supply and exhaust chambers respectively and provided with openings communicating with the service and exhaust passages respectively, removable plates closing the openings in the bottom wall of the body and contacting with said sleeves to hold the same in place, valves coöperating with seats in said sleeves, and valve stems extending through the upper ends of said sleeves.

4. In control valve mechanism, a body or casing provided with supply, service and exhaust passages, and having openings connecting the supply and service passages and the service and exhaust passages respectively, the walls of said body being provided with openings in line with each of said last named openings, sleeves fitting in said alining openings and at one end projecting beyond the wall of the body, caps closing the openings in the opposite wall of the body and contacting with said sleeves and holding them in place, stuffing boxes on the projecting ends of said sleeves, valves coöperating with the seats in said sleeves, and valve stems projecting through the stuffing boxes.

5. In control valve mechanism, a body or casing provided with supply, service and exhaust passages, and having openings connecting respectively the supply and service passages and the service and exhaust passages, and having openings in its walls in line with said last named openings, sleeves fitting in said alining openings and at one end projecting beyond the body and provided with valve seats, removable plates closing the openings in the opposite wall of the body and holding the sleeves in place, valves in said sleeves coöperating with said seats, valve operating stems extending through the projecting ends of said sleeves, and means for operating said valves alternately comprising a lever, and reversely arranged members acting on the valve stems and operatively connected to the lever.

6. In control valve mechanism, a body or casing provided with supply, service and exhaust passages, and having openings connecting respectively the supply and service passages and the service and exhaust passages, and having openings in its walls in line with each of said openings, sleeves fitting in said alining openings and at one end projecting beyond the body, removable plates closing the openings in the opposite wall of the body and holding the sleeves in place, valves in said sleeves, valve operating stems extending through the projecting ends of said sleeves, and means for operating said valves comprising a lever and reversely arranged rocking cams arranged to act on the valve stems and operatively connected to said lever.

7. Four-way control valve mechanism, comprising a body provided with supply, service and exhaust ports and passages, two inlet valves and two exhaust valves controlling said ports and passages, springs normally closing said valves and operating mechanism therefor comprising a lever, a pair of oppositely arranged rocking members, and means operatively connecting the same to said lever, each of said rocking members being provided with a pair of oppositely arranged cams arranged to open the inlet and exhaust valves.

8. Four way control valve mechanism comprising a body provided with supply, service and exhaust ports and passages, two inlet valves and two exhaust valves controlling said ports and passages; springs arranged to normally close said valves and actuating mechanism for said valves comprising a lever, a pair of oppositely arranged rocking members, and links connecting said rocking members and lever, each of said rocking members being provided with a pair of oppositely arranged cams arranged to open the inlet and exhaust valves.

9. In control valve mechanism, a body provided with an inlet and an outlet chamber with an opening connecting the same and having openings in its top and bottom walls in alinement with said connecting opening, a sleeve fitting in the connecting opening and projecting through the opening in one of the walls of the body, a plate closing the opening in the other wall of the body and contacting with said sleeve, a valve in said sleeve coöperating with a seat therein, a spring arranged to hold said valve to its seat, and a valve stem extending through the projecting end of said sleeve.

In testimony whereof, I have hereunto set my hand.

GEORGE F. SCHODDE.

Witnesses:
JOHN S. CORT,
F. W. WINTER.